INVENTOR
T. N. LOWRY
BY
R. C. Winter
ATTORNEY

Aug. 22, 1967 T. N. LOWRY 3,337,849
MATRIX CONTROL HAVING BOTH SIGNAL AND CROSSPOINT FAULT DETECTION
Filed Nov. 26, 1963 4 Sheets-Sheet 3

United States Patent Office 3,337,849
Patented Aug. 22, 1967

3,337,849
MATRIX CONTROL HAVING BOTH SIGNAL AND CROSSPOINT FAULT DETECTION

Terrell N. Lowry, Columbus, Ohio, assignor to Bell Telephone Laboratories, Incorporated, New York, N.Y., a corporation of New York Filed Nov. 26, 1963, Ser. No. 326,003
1 Claim. (Cl. 340—166)

This invention relates generally to the detection of faults in translation and selection circuits, and more particularly to the automatic detection and isolation of faults in translation circuits and in the selection circuits which they selectively control.

The translation of multibit address information into corresponding *m* out of *n* information is well known. One illustration of such an operation is the selection of one of a plurality of rows and one of the plurality of columns of a matrix to define a selected matrix crosspoint in accordance with a multibit address. Other similar translation operations are required throughout modern telephone switching and data processing systems. The accuracy of such translations is directly reflected in a system's operational reliability. Therefore, it is imperative that translations be accurate to insure the reliable operation of a telephone switching or data processing system.

Various checking circuits have been employed in the past to verify either the accuracy or the plausibility of translated information. Often, translated information is retranslated into its original form and, compared with the original address information to determine the accuracy of translation. This operation requires not only additional time, but also complex and expensive translation circuits for returning the translated information to its original multibit form. Other checking circuits verify only the plausibility of a translation by determining that at least and no more than the proper number of output signals are provided by a translator circuit. A further type of checking circuit includes duplicate translation circuits whose corresponding output terminals are connected to AND gates. The outputs of the AND gates verify the similarity of two translations of the same address information. This type of circuit requires an AND gate per translator output, and it will not verify translation accuracy by detecting any spurious output signals in excess of a proper translation.

It is an object of my invention to verify the accuracy and plausibility of each translation performed by a translator circuit.

This and other objects of my invention are achieved in one illustrative embodiment thereof wherein a primary translator circuit selectively applies a control potential through impedances to a translation accuracy check circuit. The impedances are connected between the respective output conductors of the primary translator and the accuracy check circuit to permit use of the control potential to selectively control other circuits.

The accuracy check circuit includes a secondary translator circuit, an OR gate and a current detector. The control potential is selectively applied by the primary translator circuit through the impedances to the inputs of the OR gate in accordance with address information. The output of the OR gate is connected to the current detector, which is responsive to the control potential and to other potentials greater than a given reference potential. The secondary translator circuit is similar to the primary translator circuit. It selectively applies the reference potential to the inputs of the OR gate in accordance with the same address information which controls the primary translator. Thus, selected OR gate inputs are clamped to the reference potential, thereby inhibiting application of the selectively applied control potential to the current detector. Any spurious potential present on a nonselected OR gate input will be detected by the current detector. The absence of spurious potentials thereat indicates that no false output signals are included in the translation. The presence of spurious potentials indicates that the translation is faulty.

The primary translator circuit output conductors are also connected to a plausibility check circuit comprising a current quantizing circuit which verifies that at least the proper number of primary translator output signals are present.

It is a feature of my invention that a translation accuracy check circuit be so connected to the output conductors of a primary translator circuit that a translation-inaccurate indication is provided when spurious output signals are applied to the output conductors of the primary translator circuit.

It is another feature of my invention that a translation plausibility check circuit be so connected to the output conductors of the primary translator circuit that a translation-implausible indication is provided when less than a proper number of output signals are applied to the output conductors of the primary translator circuit.

Another feature of my invention is the incorporating of the aforenoted translation-inaccurate and translation-implausible indications into a single translation-fault signal indicating a faulty translation by the primary translator circuit.

In accordance with a further feature of my invention, the accuracy check circuit includes a second translator circuit which selectively applies a clamping potential to the output conductors of the primary translator circuit so as to inhibit application of genuine primary translator output signals to a current responsive fault detector, thereby permitting detection of spurious primary translator output signals.

In accordance with a still further feature of my invention, impedances are connected between the primary translator output conductors and the location at which the clamping potential is applied by the secondary translator circuit to prevent full dissipation of the genuine primary translator output signals and thereby permit their use to control other circuits.

In accordance with still another feature of my invention, the translation accuracy check circuit further includes an OR gate through which the current responsive fault detector is connected through the aforenoted impedance to the output conductors of the primary translator circuit.

My invention may be advantageously utilized in the selective control of a coincident voltage type matrix. In such a matrix, control conductors defining the rows and columns of the matrix are connected at their respective intersections or crosspoints by a load element. The load element of a selected crosspoint is energized by applying nonsymmetrical control potentials to the particular row and column control conductors whose intersection defines the selected crosspoint. Diodes, or other unilateral current devices, are serially connected with the crosspoint load element to eliminate "sneak paths" through which nonselected crosspoints would otherwise be energized. Should one of these isolating diodes become short-circuited, the reliable control of the matrix would be impaired by the false energizing of nonselected crosspoints.

It is another object of my invention automatically to detect the presence of faulty crosspoints in a matrix.

This and other objects are accomplished in another embodiment of my invention wherein a coincident voltage type matrix is selectively controlled by a selection circuit comprising two of the above-described primary translator circuits and their associated accuracy check circuits. When a matrix crosspoint is faulty due to a short-circuited isolating diode, the control potential applied by a primary translator to a selected row or column control conductor will be applied by way of the faulty crosspoint to a nonselected row or column control conductor. This spurious potential is detected by the appropriate accuracy check circuit, as described above, thus indicating either a faulty translation by the translator circuit or a faulty crosspoint in the matrix.

Still another feature of my invention is the selective application of clamping potential to the control conductors of a switching matrix, so as to inhibit application of the control potential on selected control conductors to current responsive fault detectors, thereby permitting detection of spurious potentials on nonselected control conductors.

When a faulty matrix crosspoint is detected, it must be located and replaced. In the past, it generally has been necessary to interrupt circuit operations involving the matrix until a faulty crosspoint thereof was located and replaced.

It is a further object of my invention automatically to isolate a faulty crosspoint in a matrix without interrupting circuit operations thus permitting continued reliable use of the matrix.

This and other objects of my invention are accomplished in accordance with another aspect thereof wherein each matrix crosspoint includes a fuse connected in series with its isolating diode and its load element. In response to the detection of a faulty crosspoint, potentials are applied to all row and column control conductors of the matrix so as to reverse bias all of the crosspoint diodes. Current will flow only through those fuses whose associated diodes are short-circuited. The reverse biasing potentials exceed the control potential either in magnitude or duration of application or both. Therefore, the resulting current will melt the fuse associated with the faulty diode thus opening the energizing circuit of the faulty crosspoint and effectively isolating it from all other crosspoints of the matrix. The undesired sneak path is thereby eliminated, and the matrix may continue in use until some later convenient time when the faulty crosspoint may be replaced.

A still further feature of my invention is the inclusion of a fuse in series with each matrix crosspoint isolation device and the automatic application of reverse-biasing potentials to all isolation devices so as to selectively open the energizing circuit of any crosspoint having a faulty isolation device.

These and other objects and features of my invention will be more readily understood from the following description when read with reference to the drawing wherein.

Figures 1, 5:
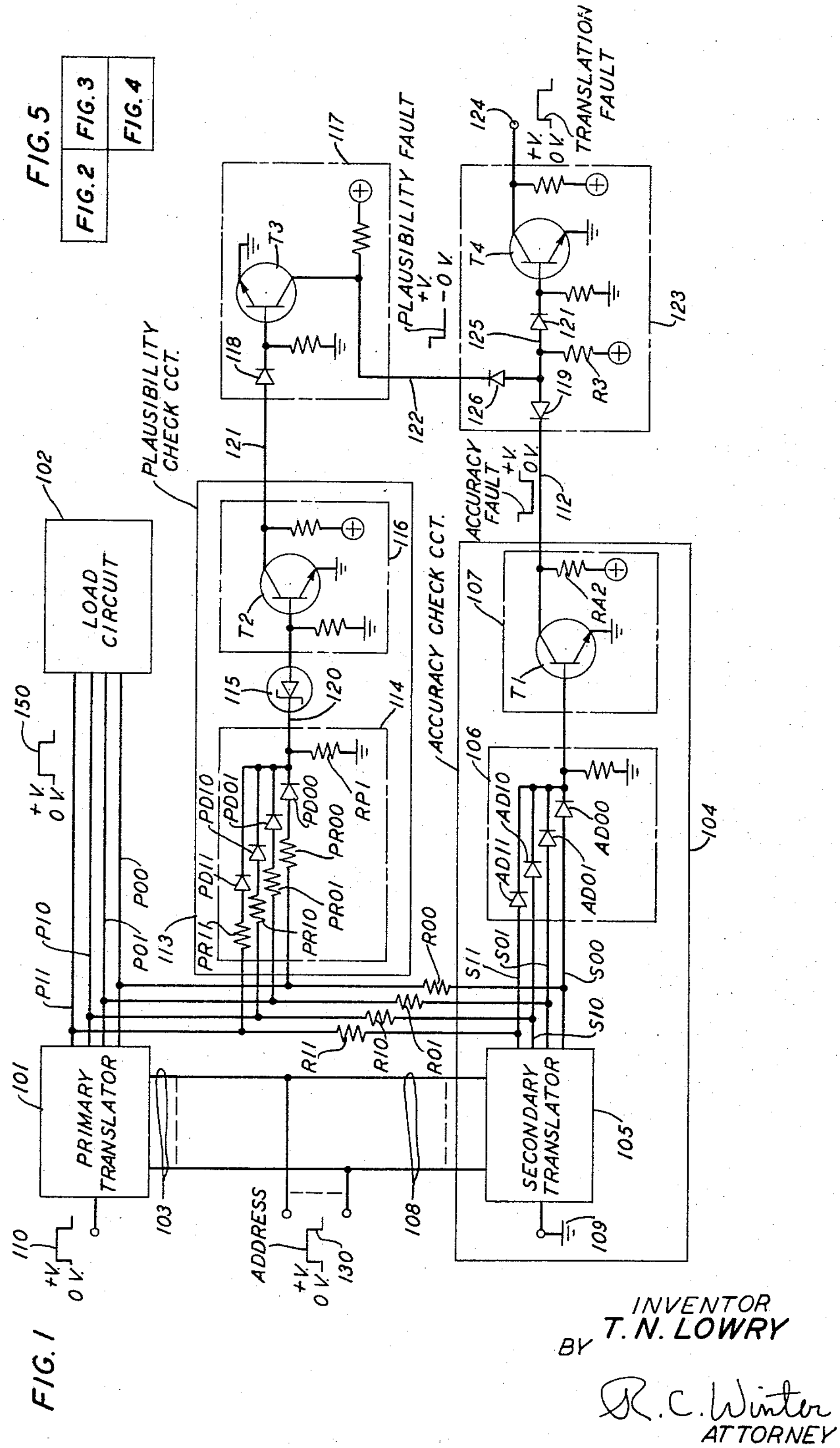
FIG. 1 depicts an illustrative embodiment of my invention comprising a selection circuit and associated translation check circuits.
FIG. 5 shows the proper arrangement of FIGS. 2, 3 and 4.
Figure 2:
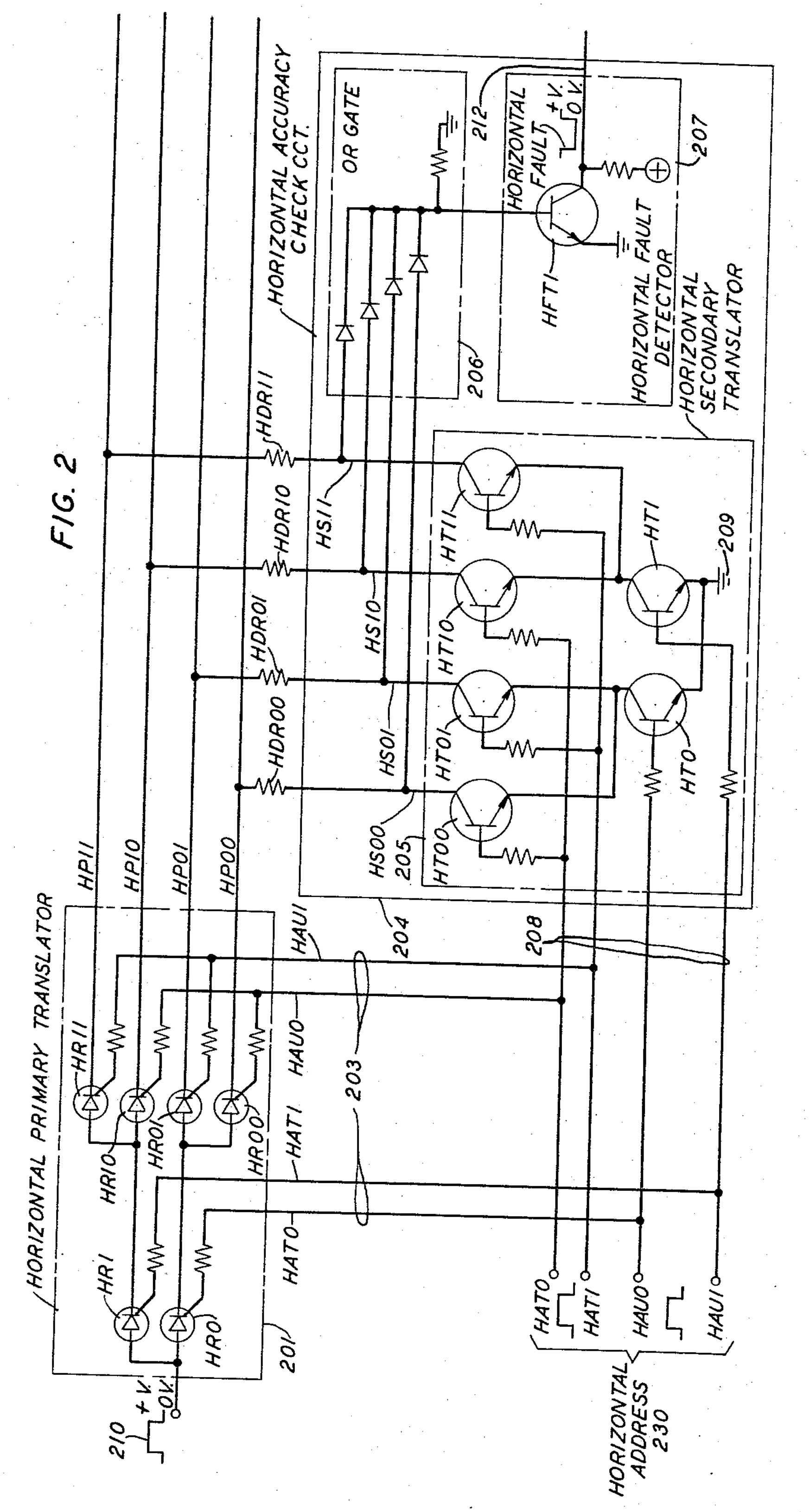
FIGS. 2, 3 and 4 depict a further illustrative embodiment of my invention comprising a selection matrix and its associated translation and matrix check circuits.

The primary translator 101 of FIG. 1 may comprise any of the well-known translator circuits which are responsive to input address information to selectively apply a control potential, such as 110, to its output conductors, such as P11, P10, P01 and P00. As translator 101 forms no part of the present invention and as such circuits are well known in the telephone switching and data processing art, no detailed description thereof is included herein. An illustrative example of this type of circuit is shown in FIG. 2 as horizontal primary translator 201, which will be described briefly later herein.

Figure 3:
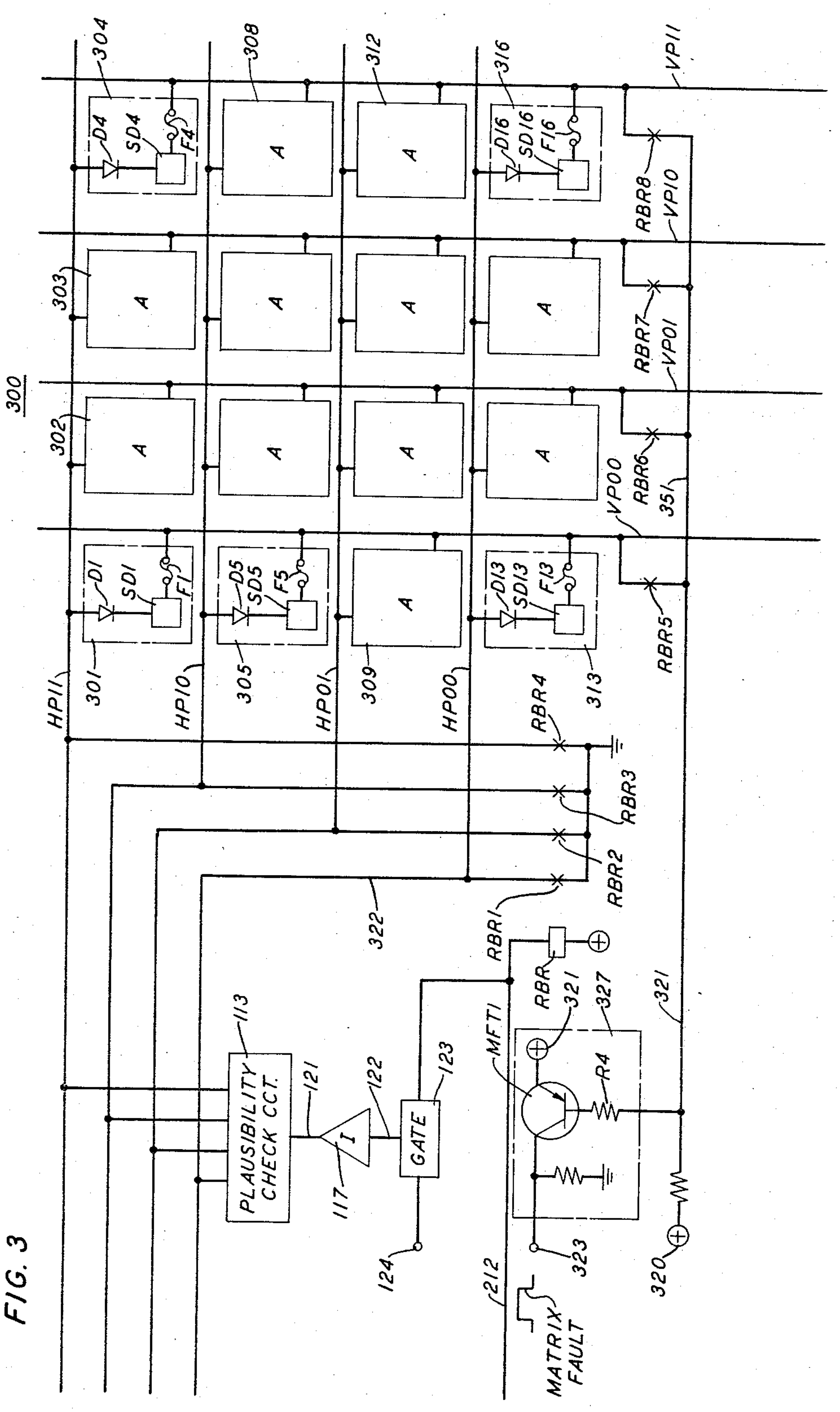

The load circuit 102 may be any of the many well-known circuits whose operation is selectively controlled in accordance with output signals from a translator. The matrix 300 of FIG. 3 is one illustrative example of such a circuit, and is described later herein.

The output conductors P11, P10, P01 and P00 of primary translator 101 are directly connected to load circuit 102. Load circuit 102 is selectively controlled in accordance with primary translator output signals 150 transmitted thereto by way of primary output conductors P11, P10, P01 and P00. Address information defining a particular one or ones of primary output conductors P11, P10, P01 and P00 is supplied to translator 101 over address input conductors 103. Translator 101 selectively applies a control potential 110 to the one or ones of primary output conductors P11, P10, P01 and P00 defined by the address information 130.

*Translation accuracy check*

Translation accuracy check circuit 104 includes a secondary translator 105, an OR gate 106 and a current responsive fault detector 107. Secondary translator 105 may comprise any well-known translator circuit which is similar in function to primary translator 101. One example of such a translator circuit is illustrated by horizontal secondary translator 205 of FIG. 2 which is described briefly later herein. The same address information 130 to which primary translator 101 responds is supplied simultaneously to secondary translator 105 over address input conductors 108. Secondary translator 105 selectively applies a reference potential 109 to the one or ones of its secondary output conductors S11, S10, S01 and S00 defined by the address information 130.

The secondary output conductors S11, S10, S01 and S00 respectively correspond to primary translator output conductors P11, P10, P01 and P00. Each primary output conductor P11, P10, P01 and P00 is connected through an impedance R11, R10, R01 and R00 to its corresponding secondary output conductor S11, S10, S01 and S00. The secondary output conductors S11, S10, S01 and S00 are each connected to a diode AD11, AD10, AD01 and AD00 of OR gate 106. The output of OR gate 106 is connected to a current responsive fault detector 107.

The following operational description of accuracy check circuit 104 assumes, for purposes of illustration, that control potential 110 is a pulse of positive potential and that the reference potential 109 is ground potential. It is also assumed that primary translator 101 is arranged to energize one of its output conductors P11, P10, P01 and P00 in accordance with address information 130, and that secondary translator 105 is arranged to apply ground potential to one of its output conductors S11, S10, S01 and S00 in accordance with address information 130.

Address information 130 is supplied simultaneously to primary translator 101 over address input conductors 103 and to secondary translator 105 over address input conductors 108. Address information 130 defines primary output conductor P11 and its corresponding secondary output conductor S11. Control potential 110 is selectively applied to primary output conductor P11 by primary translator 101, and ground potential is selectively applied to secondary output conductor S11 by secondary translator 105. The control potential 110 on primary output conductor P11 is applied through resistor R11 to secondary output conductor S11. However, secondary output conductor S11 is maintained at ground potential 109 by secondary translator 105. The voltage drop across resistor R11 prevents the complete dissipation of the control potential 110 on primary output conductor P11 when secondary output conductor S11 is clamped to ground potential 109 by secondary translator 105. The potential on primary output conductor P11 remains sufficiently positive to exert control over the operation of load circuit 102. Since secondary output conductor S11 is clamped to ground potential, no current will flow through diode AD11 of OR gate 106.

It is now assumed that, due to some circuit fault in primary translator 101, a spurious pulse of positive potential is applied to a nonselected primary output conductor P01. Secondary translator 105 does not apply ground potential to the corresponding secondary output conductor S01, since conductor S01 is not defined by the address information 130 supplied to secondary translator 105. The existence of identical faults in primary translator 101 and secondary translator 105 is extremely remote, and it therefore is assumed that no similar fault exists in secondary translator 105. The spurious positive potential on primary output conductor P01 is applied through resistor R01 to secondary output conductor S01. Since secondary output conductor S01 is not clamped to ground potential 109 by secondary translator 105, current will flow through diode AD01 of OR gate 106.

Fault detector 107 is a current responsive circuit including a transistor T1. Transistor T1 normally is nonconductive, and conductor 112, therefore, normally is positive with respect to ground potential. When current flow is produced through diode AD01 by a spurious positive potential on nonselected primary output conductor P01, the base-emitter junction of transistor T1 is forward biased, and transistor T1 becomes conductive. When transistor T1 becomes conductive, the potential on conductor 112 is sharply lowered to ground potential. Spurious potentials on the other nonselected primary output conductors P10 and P00 are indicated in a similar manner. Thus, the transition of conductor 112 from positive potential to ground potential is a translation-inaccurate indication which represents the presence of a spurious potential on a nonselected primary output conductor P10, P01 or P00.

Although the above description assumed that primary translator 101 and secondary translator 105 were arranged to select only one output conductor thereof in accordance with address information, the above description is equally applicable to other well-known types of translators which are arranged to select more than one of their respective output conductors.

*Translation plausibility check*

Plausibility check circuit 113 includes a current quantizing circuit 114 whose output conductor 120 is connected through a voltage threshold device 115 to a detector circuit 116. When at least the proper number of primary output conductors P11, P10, P01 and P00 have control potential 110 applied thereto, conductor 121 is abruptly lowered from a positive potential to ground potential. This abrupt transition from positive to ground potential is a translation-plausible indication which indicates that the translation performed by primary translator 101 produced at least the proper number of output signals.

It is now assumed, for purposes of operational description, that primary translator 101 is arranged to selectively apply control potential 110 to two of the primary output conductors P11, P10, P01 and P00 in accordance with address information 130 supplied thereto. Address information 130 defining conductors P11 and P00 is supplied to primary translator 101 over address input conductors 103. Control potential 110 is then applied to primary output conductors P11 and P00 by primary translator 101. When control potential 110 is applied to primary output conductors P11 and P00, current flows through resistors PR11 and PR00, diodes PD11 and PD00 and resistor RP1.

The current flow through resistor RP1 is proportional to the number of the primary output conductors P11, P10, P01 and P00 having control potential 110 applied thereto. Assuming that the resistance of each of the resistors PR11, PR10, PR01 and PR00 is equal to $R_{pr}$; that E is equal to the control potential 110; that $n$ is equal to the number of primary output conductors which have control potential 110 applied to them; that resistor RP1 has a value of $R_{rp}$; and that the current flow through resistor RP1 has a value of $I_{rp}$; then:

$$I_{rp}=\frac{E}{\left(R_{rp}+\frac{R_{pr}}{n}\right)}$$

Accordingly, as more of the primary output conductors P11, P10, P01 and P00 have control potential 110 applied thereto, the voltage drop across resistor RP1 is correspondingly increased, and the potential applied to conductor 120 is proportionately raised. Thus, the potential applied to conductor 120 reflects the number of primary output conductors P11, P10, P01 and P00 to which control potential 110 is applied.

Zener diode 115 is selected so as to have a voltage threshold which is equivalent to the potential applied to conductor 120 when the proper number of primary output conductors P11, P10, P01 and P00 are energized. Since primary translator 101 is arranged to energize two of its output conductors P11, P10, P01, and P00, zener diode 115 has a voltage threshold which is equivalent to the potential applied to conductor 120 when at least two of the primary output conductors P11, P10, P01 and P00 are energized by primary translator 101. When less than two of the primary output conductors P11, P10, P01 and P00 are energized, the potential applied to conductor 120 is less than the voltage threshold of zener diode 115. However, when at least two of the conductors P11, P10, P01 and P00 are energized, the potential applied to conductor 120 is equal to or greater than the voltage threshold of zener diode 115.

When the threshold voltage of zener diode 115 is exceeded, positive potential is applied through zener diode 115 to the base element of transistor T2, thereby forward biasing the base-emitter junction of transistor T2. Transistor T2 normally is nonconductive, and conductor 121, therefore, normally is positive with respect to ground potential. When the base-emitter junction of transistor T2 is forward biased, transistor T2 becomes conductive, and conductor 121 is abruptly lowered from its normal positive potential to ground potential. Thus, when conductor 121 is at ground potential, a plausible translation by primary translator 101 is indicated. However, if conductor 121 remains positive with respect to ground potential, an implausible translation by primary translator 101 is indicated.

When conductor 112 is positive with respect to ground potential and conductor 121 is at ground potential, the translation of address information 130 by primary translator 101 is indicated to be both accurate and plausible. When conductor 112 is at ground potential or when conductor 121 is positive with respect to ground potential, a faulty translation of address information 130 by primary translator 101 is indicated. Inverter circuit 117 and gate circuit 123 are provided to incorporate the translation accuracy and plausibility indications provided by the respective potentials on conductors 112 and 121 into a single indication representing either a completely plausible and accurate translation or a faulty translation.

Transistor T3 of inverter 117 normally is conductive due to the normally positive potential on conductor 121. Therefore, conductor 122 normally is held at ground potential. When conductor 121 is lowered to ground potential, the normal forward bias on the base-emitter junction of transistor T3 is removed, and transistor T3 becomes nonconductive. At this time, conductor 122 is sharply raised from ground potential to a positive potential. Thus, a plausible translation will be indicated by conductor 122 becoming positive with respect to ground potential, and an implausible translation will be indicated by conductor 122 remaining at ground potential.

The base-emitter junction of transistor T4 is normally forward biased through resistor R3, conductor 125, and diode 121. Therefore, transistor T4 normally is conductive, and terminal 124 normally is maintained at ground potential. Should either or both of the conductors 112 and 122 be at ground potential, a low impedance to ground is presented to conductor 125 by diodes 119 or 126, and the forward bias applied to the base-emitter junction of transistor T4 is sufficiently decreased to cause transistor T4 to become nonconductive. When transistor T4 becomes nonconductive, terminal 124 is abruptly raised from ground potential to positive potential and a faulty translation is thereby indicated.

*Matrix fault detection*

Figure 4:
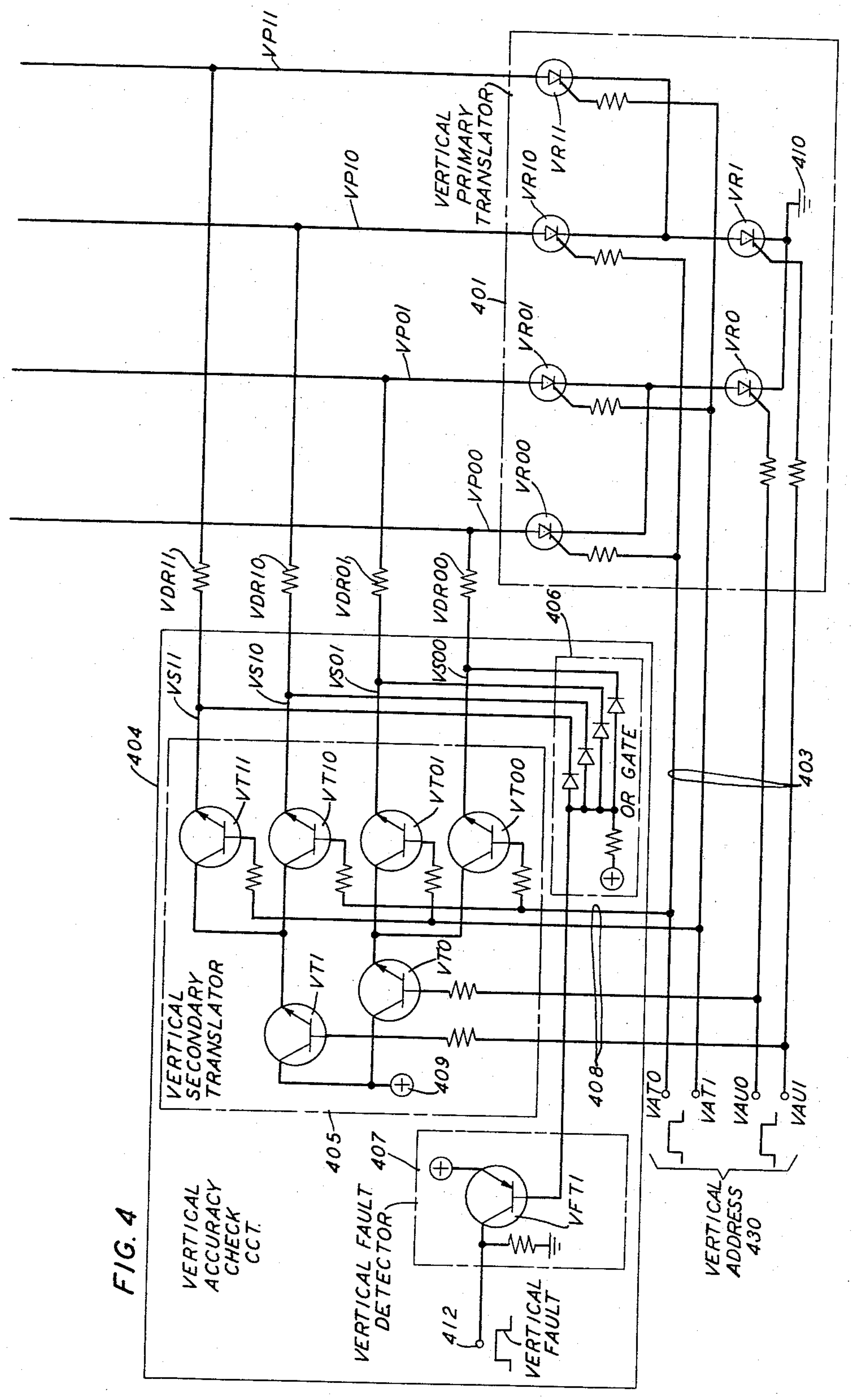

FIGS. 2, 3 and 4 depict one illustrative embodiment of my invention which may be used advantageously to detect faults in an end marked selection matrix and in the translation circuits which selectively control the matrix. FIG. 3 also shows circuitry which differentiates between translator and matrix faults and which selectively isolates faulty matrix crosspoints.

Matrix 300 comprises a plurality of horizontal control conductors HP11, HP10, HP01 and HP00; a plurality of vertical control conductors VP11, VP10, VP01 and VP00; and a plurality of crosspoints 301–316, respectively defined by intersections of the horizontal control conductors HP11, HP10, HP01 and HP00 and the vertical control conductors VP11, VP10, VP01 and VP00. Each crosspoint 301–316 includes a two-terminal controllable switching device SD, a fuse F and an isolating diode D. The switching devices SD are selectively energized by the application of a pulse of positive control potential 210 by horizontal primary translator 201 to a selected one of horizontal control conductors HP11, HP10, HP01 and HP00, and the simultaneous application of ground control potential 410 by vertical primary translator 401 to a selected one of vertical control conductors VP11, VP10, VP01 and VP00. For example, the simultaneous application of a pulse of positive potential 210 to horizontal control conductor HP11 and ground potential 410 to vertical control conductor VP00 will energize switching device SD1 of crosspoint 301.

The switching devices SD1–SD16 may comprise any well-known two-terminal load element which is responsive to the simultaneous application of nonsymmetrical control potentials to its respective terminals. Matrix 300 may be used as a selection matrix, in which event the switching devices SD1–SD16 serve to provide output signals to which other circuits of the system respond. Matrix 300 also may be used as a switching matrix in which event the switching devices SD1–SD16, or relay contacts controlled thereby, provide selectable communcations paths between other circuits of the system. One advantageous use of matrix 300, as illustrated in T. N. Lowry Patent 3,037,085 which issued on May 29, 1962, is the selection of communications paths through a switching network. The switching devices SD1–SD16 of matrix 300 may advantageously correspond to the ferreed control windings identified by the number 74 in the drawing of the aforenoted Lowry patent.

In a selection or switching matrix, such as matrix 300, open circuited isolating diodes may be tolerated. Since the associated switching devices cannot be energized, this condition merely reduces the selecting capacity of the matrix. However, short-circuited isolating diodes and inaccurate applications of control potentials cannot be tolerated, since these conditions will cause nonselected switching devices to be energized. Such false operations are highly detrimental to the system functions controlled thereby, and their cause must be located and eliminated expeditiously.

Horizontal primary translator 201 may comprise a translating tree arrangement of PNPN triodes HR0–HR11, often identified as "silicon controlled rectifiers." Vertical primary translator 401 may also comprise a translating tree arrangement of PNPN triodes VR0–VR11. It is assumed, for purposes of this operational description, that horizontal address information 230 defining horizontal control conductor HP11 is supplied simultaneously to horizontal primary translator 201 and horizontal secondary translator 205, and that vertical address information 430 defining vertical control conductor VP00 is supplied simultaneously to vertical primary translator 401 and vertical secondary translator 405. Accordingly, horizontal address pulses 230 are applied to horizontal address conductor HAT1 and HAU1. PNPN triodes HR1, HR01 and HR11 are enabled by the application of horizontal address pulses 230 to their respective gate elements, and positive potential 210 is applied to horizontal control conductor HP11 through PNPN triodes HR1 and HR11. Vertical address pulses 430 are applied to vertical address conductors VAT0 and VAU0. PNPN triodes VR0, VR00 and VR10 are enabled by the application of vertical address pulses 430 to their respective gate elements, and ground potential 410 is applied to vertical control conductor VP00 through PNPN triodes VR0 and VR00. In response to this simultaneous application of nonsymmetrical control potentials 210 and 410 respectively to horizontal control conductor HP11 and vertical control conductor VP00, the switching device SD1 of crosspoint 301 is energized.

The horizontal and vertical accuracy check circuits 204 and 404 function in the same manner as set forth above with reference to translation accuracy check circuit 104 of FIG. 1. Horizontal secondary translator 205 of horizontal accuracy check circuit 204 may comprise a translating tree arrangement of NPN transistors HT0–HT11 which are selectively turned ON in accordance with the horizontal address information 230. Horizontal secondary translator 205 selectively applies ground potential 209 to its output conductor HS11 to inhibit application of the positive potential 210 on the corresponding selected horizontal control conductor HP11 to the horizontal fault detector 207. When spurious positive potentials are present on nonselected horizontal control conductors HP10, HP01 or HP00, they are detected through OR gate 206 by transistor HFT1. A horizontal fault is indicated by the transition of conductor 212 from a normally positive potential to ground potential.

Vertical secondary translator 405 of vertical accuracy check circuit 404 also may comprise a translating tree arrangement of NPN transistors VT0–VT11 which are selectively turned ON in accordance with vertical address information 430. Vertical secondary translator 405 selectively applies positive potential 409 to its output conductor VS00 to inhibit application of the ground potential 410 on the corresponding vertical control conductor VP00 to the vertical fault detector 407. When spurious ground potentials are present on nonselected vertical control conductors VP11, VP10 or VP01, they are detected through OR gate 406 by PNP transistor VFT1. A vertical fault is indicated by the transition of terminal 412 from its normal ground potential to a positive potential.

Plausibility check circuit 113, inverter circuit 117 and gate circuit 123 function with fault detector 207 as described above to indicate an implausible translation at terminal 124.

Spurious potentials may be applied to nonselected horizontal control conductors HP10, HP01 and HP00 due to a short-circuited diode D as well as due to an inaccurate translation of horizontal address information 230 by horizontal primary translator 201. For example, should diode D16 of crosspoint 316 be short-circuited, the positive potential 210 applied to horizontal control conductor HP11 is transmitted through crosspoint 304, over vertical control conductor VP11, through crosspoint 316 to horizontal control conductor HP00, through crosspoint 313 and over vertical control conductor VP00 to ground 410. If this occurs, the spurious positive potential on the nonselected horizontal control conductor HP00 is detected by accuracy check circuit 204 in the same manner as spurious output signals from horizontal primary translator 201 are detected, and a horizontal fault is similarly indicated.

Since a horizontal fault indication on conductor 212 may represent either a faulty translation of horizontal address information 230 or a faulty matrix crosspoint, it is advantageous to determine in which circuit the fault exists. Reverse biasing relay RBR and matrix fault detector 327 are provided for this purpose. When conductor 212 is at ground potential, due to the detection of a horizontal fault, a circuit is completed for the operation of relay RBR. When relay RBR operates, ground potential is applied through its make contacts RBR1–RBR4 to all horizontal control conductors HP00, HP01, HP10 and HP11, and positive potential 320 is applied through its make contacts RBR5–RBR8 to all vertical control conductors VP00, VP01, VP10 and VP11. Due to the polarity of these reverse biasing potentials and the manner in which the crosspoint diodes D are connected, no current should flow through any of the matrix control conductors if all crosspoint diodes are functioning properly. However, should any diodes D be short-circuited, current will flow through the short-circuited diodes D. This current is detected by transistor MFT1, thus indicating that the previously detected horizontal fault exists in matrix 300. For example, if diode D16 of crosspoint 316 is short-circuited, PNP transistor MFT1 will be forward biased over a circuit extending from positive potential 321 through its emitter-base junction, through resistor R4, over lead 321, through make contact RBR8, over vertical control conductor VP11, through fuse F16, switching device SD16 and short-circuited diode D16, over horizontal control conductor HP00 and conductor 322, and through make contact RBR1 to ground potential. Transistor MFT1 is thus turned ON, and terminal 323 is changed from its normal potential to a more positive potential. When the potential on terminal 323 becomes more positive with respect to ground, a matrix fault is indicated.

*Isolation of matrix faults*

Since a faulty isolating diode can be highly detrimental to system operations controlled by a matrix, it is advantageous to disable the energizing circuit of the crosspoint associated with the faulty diode thus preventing false operations of nonselected crosspoints of the matrix. The reverse biasing potential 320 applied through the make contacts RBR5–RBR8 of relay RBR exceeds the normal control potential 210 to which the crosspoints 301–316 of matrix 300 respond either in magnitude or duration or both. Therefore, when the reverse biasing potential 320 causes current to flow in a reverse direction through a short-circuited diode, as described above, the fuse F associated with the short-circuited diode D will melt, thereby opening the circuit for energizing the crosspoint which includes the short-circuited diode D. For example, again assuming that diode D16 of crosspoint 316 is short-circuited, current will flow over the above-traced path including diode D16 and fuse F16. Fuse F16 melts and opens the circuit for energizing switching device SD16. When fuse F16 melts, the sneak path over which positive potential 210 may be applied to a nonselected horizontal control conductor HP00 is opened and future spurious crosspoint selections are prevented.

It is to be understood that the above-described arrangements are illustrative of the principles of my invention. Numerous other arrangements may be devised by those skilled in the art without departing from the spirit and scope of my invention.

What is claimed is:

An error checking selection circuit for accessing selectively a matrix having crosspoints which include unilateral current devices connected between horizontal and vertical selection control conductors comprising a first translator whose output conductors are connected to said horizontal selection control conductors and selectively responsive to an address for applying a control potential to a selected horizontal selection control conductor, a second translator having a plurality of output conductors each corresponding to one of said horizontal selection control conductors and selectively responsive to said address for applying a reference potential distinct from said control potential to the output conductor of said second translator corresponding to said selected horizontal selection control conductor, means including a resistance for connecting each of said second translator output conductors to the corresponding one of said horizontal selection control conductors, means connected to each of said resistances for detecting a selection error and enabled upon occurrence of inconsistent outputs from said first and second translators and upon occurrence of a short circuited unilateral current device in said matrix, and means for distinguishing between enablement of said detecting means by a selection error and enablement of said detecting means by a short circuited unilateral current device, said distinguishing means comprising means responsive to the enablement of said detecting means for applying potentials to each of said horizontal and vertical selection control conductors so as to reverse bias said unilateral current devices and means for detecting current flow through any of said selection control conductors.

References Cited

UNITED STATES PATENTS

| | | | |
|---|---|---|---|
| 2,484,226 | 10/1949 | Holden | 340—146.15 |
| 2,950,464 | 8/1960 | Hinton et al. | 340—146.1 X |
| 2,979,695 | 4/1961 | Tyrlick et al. | 340—146.2 |
| 3,237,025 | 2/1966 | Clapper | 340—146.2 |
| 3,241,114 | 3/1966 | Zieper et al. | 340—146.2 |

NEIL C. READ, *Primary Examiner.*

H. PITTS, *Assistant Examiner.*